UNITED STATES PATENT OFFICE.

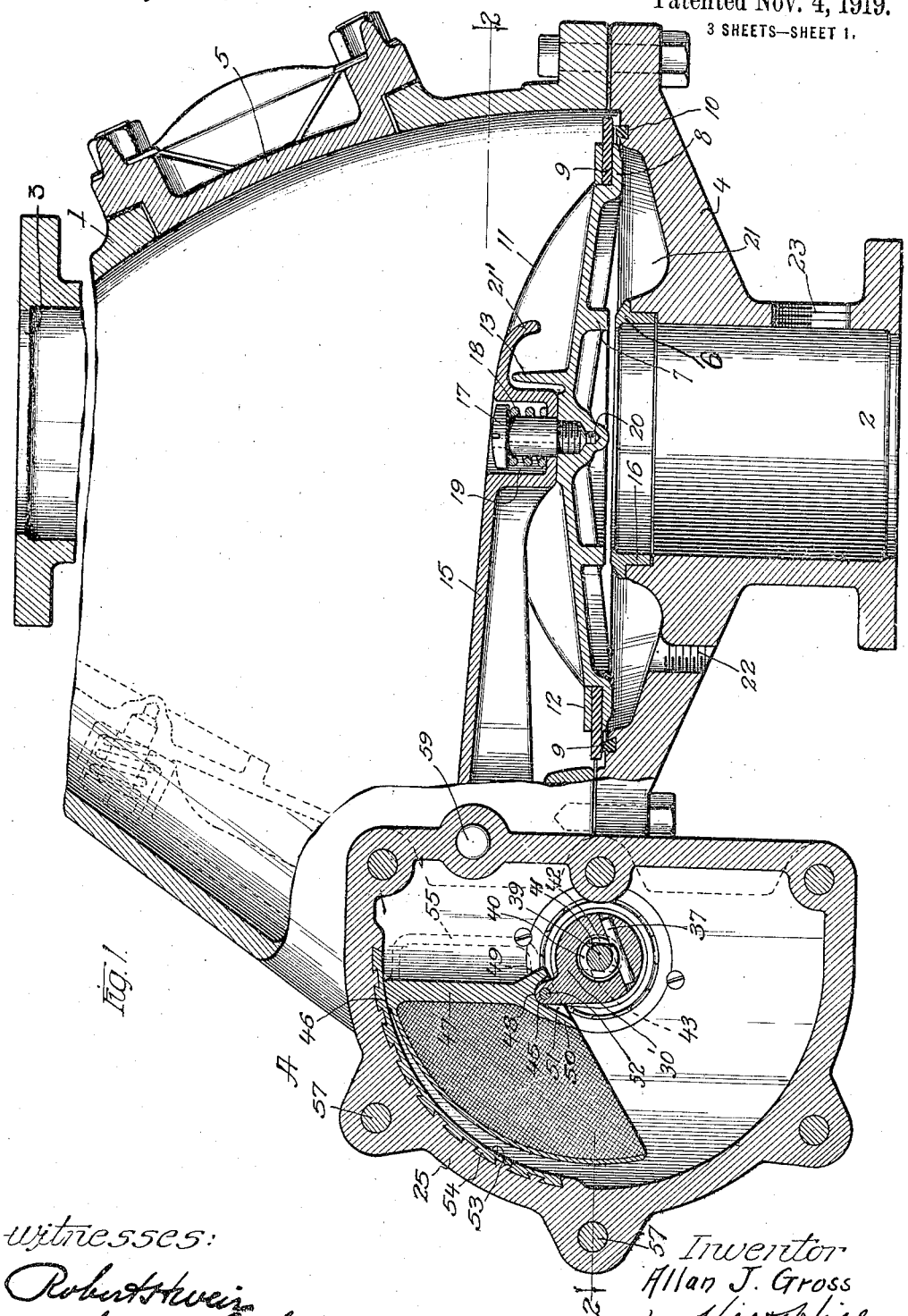

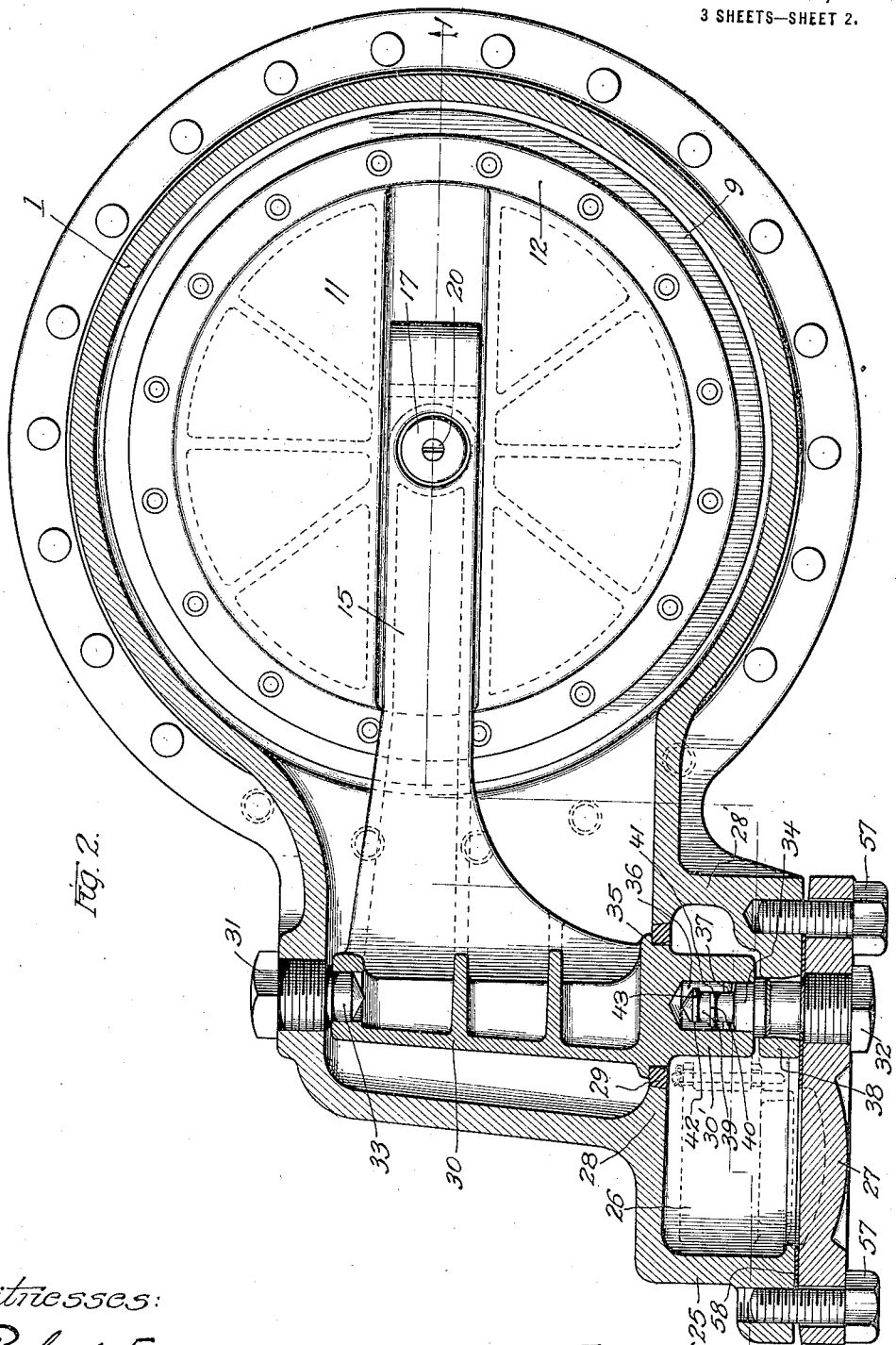

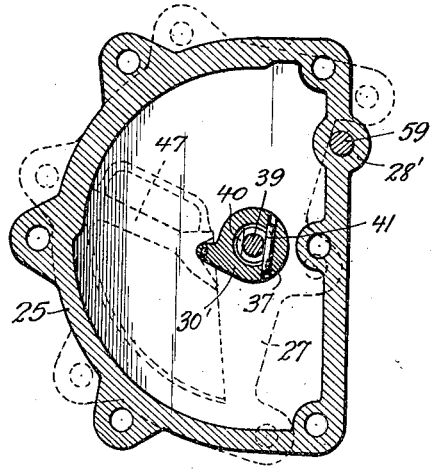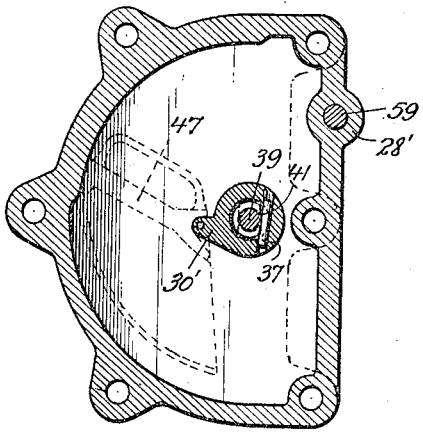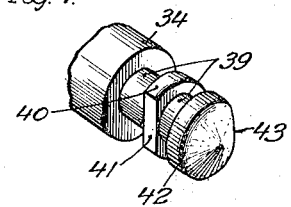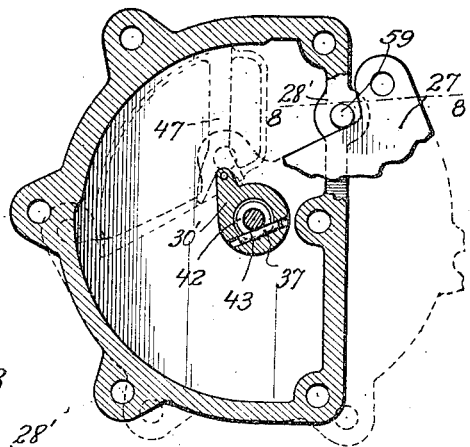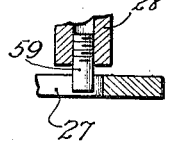

ALLAN J. GROSS, OF CHICAGO, ILLINOIS, ASSIGNOR TO JOHN L. KENNEDY, OF CHICAGO, ILLINOIS.

DRY-PIPE VALVE.

1,320,389.  Specification of Letters Patent.  Patented Nov. 4, 1919.

Application filed June 23, 1917. Serial No. 176,524.

*To all whom it may concern:*

Be it known that I, ALLAN J. GROSS, a citizen of the United States, residing at Chicago, in the county of Cook and State of Illinois, have invented certain new and useful Improvements in Dry-Pipe Valves, of which the following is a description.

My invention belongs to that general class of devices known as dry pipe valves, adapted to be used in connection with automatic sprinkling systems, and particularly in dry pipe systems. The valve is placed in the water supply pipe, the pressure of the water against one side of the valve being opposed on the other side by an air pressure within the system. The invention has among its objects the production of a device of the kind described that is simple, compact, durable, reliable, efficient and satisfactory, which is positive in action, and which will be operative at all times, and not get out of order. The same has particularly as an object the production of a device which may be installed, set, and maintained without the possibility of error or mistake, and which cannot be set improperly or rendered inoperative from carelessness, without the fact being known. It has especially as an object the production of a device that is practically safe against gagging, as the differential valve or its locking mechanism cannot be blocked so as to render the same inoperative. With the device herein described there can be an unobstructed flow of water through the system, and the valve is locked against closing at any point between the closed and wide open position. It is so designed that stones, sticks, sand, or other foreign materials cannot lock the valve against opening, and thereby render it inoperative. Many other objects and advantages of the construction herein shown and described will be obvious to those skilled in the art from the disclosure herein made.

To this end my invention consists in the novel construction, arrangement and combination of parts herein shown and described and more particularly pointed out in the claims.

In the drawings, wherein like reference characters indicate like or corresponding parts, Figure 1 is a sectional view of my improved valve, taken substantially on line 1—1 of Fig. 2;

Fig. 2 is a sectional view taken substantially on line 2—2 of Fig. 1;

Figs. 3, 4, 5 and 6 are sectional views through the locking mechanism chamber, illustrating the manipulation of the parts, the same corresponding to a portion of Fig. 1;

Fig. 7 is a perspective view of a portion of one of the trunnions, and

Fig. 8 is a sectional view taken substantially on line 8—8 of Fig. 6.

Referring to the drawings, in which the preferred embodiment of my device is shown, a suitable casing is provided consisting of the upper casing part 1 and the lower casing part 4, the same being suitably secured together in any desired manner. Part 4 is provided with an inlet 2, and part 1 with an outlet 3, the valve mechanism hereafter described being arranged between the inlet 2 and outlet 3. A hand hole is preferably provided in the casing, the same being normally covered by the hand hole cover plate 5. One of the casing parts is provided with a locking mechanism chamber, as will be hereafter described in full. Arranged at the inlet on the inner side of the part 4 is a valve seat 6 preferably of bronze or like material that will not corrode. A valve 7 is provided, the same being arranged to coöperate with the valve seat 6 and prevent the passage of water through the inlet into the casing when the valve is closed. The valve 7, which is preferably constructed of non-corrodible material, such as bronze or the like, is formed with a flange 8 thereabout, which carries ring 9 arranged to coöperate with a valve seat 10 carried by the casing part 4. The ring 9 is preferably of flexible material, rubber being ordinarily used, the same being secured in place by a ring 12, and suitable screws or bolts or the equivalent for the purpose. By making the seats 6 and 10 separable they may be renewed from time to time should circumstances require. It has the added advantage that the seats may be made of non-corrodible material while the other parts of the casing may be made of cheaper material. The valve is preferably formed with a convex top, or turtle-backed, as at 11, a groove or channel being provided in or across the top, however, as most clearly shown in Figs. 1 and 2.

The valve member is carried by a valve arm 15, the same being supported at one end, as will be more fully explained hereafter. The arm 15 is secured to the valve by means of a stud 17, or its equivalent, passing therethrough and engaging the valve. In the construction shown I have shown the arm recessed as at 19, and a compensating spring 18 arranged between the head of the stud 17 and the arm. I also show a lock or retaining screw 20, which passes through the stud and engages with the valve, and serves as a lock, preventing the stud from becoming loosened. It will be noted by referring to Fig. 1 that a chamber 21 is formed between the valve seats, and in this connection it may be mentioned that the upper face of the valve seat 6 is termed the lower water seat, and the face of the valve coöperating therewith the upper water seat. The seat 10 is termed the air seat, and the chamber 21 is known as the intermediate or neutral chamber. The part 4 is also provided with a main drain outlet 23, and an alarm outlet 22, the purpose of this being well known to those skilled in the art, and the same will be hereinafter further referred to.

One of the casing parts, as shown part 1, is formed with an extension 25 at one side, arranged to form a chamber 26, which may be termed the locking mechanism or clutch chamber, to distinguish the same from the valve chamber in casing 1. As will be noted by referring to Fig. 2, a partition 28 extending between the side 28' and the side of the casing, separates the two chambers except for the opening therethrough, through which the one end of the arm 15 extends, as hereafter described. A cover plate 27, which may be termed the clutch chamber cover plate, is provided for closing the chamber and preventing the leakage of water or air therefrom. A bushing 29 is shown in the partition 28. Referring particularly to Fig. 2, the arm 15 is provided with an extending end 30, one end 30' of which extends through the bushing 29 to substantially adjacent the cover plate 27. The member 30 is pivotally supported at its ends by suitable trunnions, consisting of the screws or studs 31 and 32, which are formed as at 33 and 34 respectively to engage the part 30 at each end. It will be noted that member 30 is provided with a flange 35, arranged to bear against the bushing 29 and form a close fit thereat. The end 30' is preferably recessed or chambered at 36, and a plug or pin 37, or its equivalent, extended through 30', the same being so disposed as to lie in the recess 36. I have shown the casing provided with an extended part 38, arranged to support the trunnion 32, which is carried by the cover. The purpose of this will be more fully understood from the description hereafter in reference to manipulating the cover plate 27 in setting the valve or in removing the cover.

It will be noted by referring to Figs. 2 and 7, that the trunnion 32 is formed with a shank 39, upon which are arranged the flanges or portions 40 and 42. Portions of these flanges, however, are cut away as at 41 and 43 respectively on opposite sides, so that the trunnion may be removed in the end 30' at such times as may be desired, and in a predetermined manner. Ordinarily, however, the flange 40, or the flange 42, prevents the removal, as they engage with the pin 37, and it is necessary to manipulate the differential valve as well as cover plate 27 before the cover plate can be entirely removed.

The extending end 30' is provided with a lip or part 45, which is arranged to carry a clutch member or strut 47. The clutch member 47 is at its lower end arranged to engage at 48 between the lugs or lips 49 and 50, and be supported by 45. In the construction shown it will be noted that the clutch member is formed with the sides or flanges 51, and the interior is preferably filled with lead or otherwise weighted so that it will move to open locking position from its own weight when the valve is opened. The clutch member may be securely locked in place on extension 30' by passing a bolt or pin 52 through the flanges and the lip 45.

This clutch or lock may be described in the preferred construction as in the form of a gravity actuated clutch, the active principle of which is based on the "toggling" action of two movable members between two fixed planes, the combined length of the two members being slightly greater than the distance between the fixed planes. This clutch is mounted on the valve arm or hinge, the outer end of the clutch engaging a smooth bronze lining cast into the valve body, the surface of which is concentric with the axis of the valve arm, and corresponds to one fixed plane. When the valve operates the clutch offers no resistance to the opening action of the valve plate, but instantly arrests and positively stops any movement in the opposite or closing direction.

The clutch member is formed with a face 46, as shown, and the casing is also provided with a face arranged to coöperate therewith. I prefer to provide a separable member 54 of non-corrodible material having a face 53. The cover plate 27 is secured in place in any suitable manner, preferably by means of the studs or bolts 57, 58 being packing material, which may be arranged between the faces of the parts. I also provide a stop pin 59, which projects from the face of the wall 28', and is arranged to engage the cover, as hereafter described.

In setting the valve the system is first thoroughly drained, the hand hole cover plate 5 removed and the air and water rings, and their respective seat rings cleaned. The clutch chamber cover plate 27 is unbolted, pulled out about ⅛ of an inch, and allowed to swing about the stud 32 as an axis into the open position, the differential valve is then reseated in the following manner: Through the hand hole opening the differential valve is pushed back or upward as far as it will go with the right hand, and at the same time the clutch is pulled forward or upward with the left hand (see handle 55), thus releasing the clutch, so that the differential valve is free to travel downward. Supporting the differential valve with the right hand, and keeping the clutch pulled forward with the left hand, the differential valve is allowed to travel downwardly until the ring on the disk is opposite the center of the hand hole opening. The clutch is then allowed to fall back or lock and hold the differential valve in this position. The finger hook 21' on the differential valve arm is then grasped with the right hand and the differential valve slightly lifted at the same time the clutch is pulled forward with the left hand, grasping handle 55. Pulling forward on the clutch and holding back slightly on the differential valve, the valve is allowed to seat evenly and gently on its seats or rings.

After this the clutch chamber cover is bolted in position and all the drain valves are closed tight. The device is then primed through the hand hole opening until the water overflows this opening, and then the cover is replaced. The air pressure is pumped up in the overhead pipe, and if no leakage of priming water is noticed at the alarm outlet 22, the controlling gate or valve to the dry pipe valve casing is opened. In case it is found necessary at any time to entirely remove the clutch chamber cover plate 27 for any reason, this is done by first having the differential valve in the wide open position, so that the clutch mechanism is as shown in Fig. 3. The cover plate 27 is then unbolted and the same turned clockwise, so that the top of the plate is moved to the right against the stop 59, so that the flange will clear pin 37. The cover plate can then be pulled out about ⅝ of an inch or so, and allowed to swing to the open position. The clutch is then released and the differential valve brought to the closed or set position. The bottom of the cover plate is next turned to the left (i. e., counter clockwise) as far as the stop 59 (see Fig. 6) and can then be removed by pulling outward, as flange will clear pin 37. To replace the cover plate on the clutch chamber, the above operations are reversed. However, since the valve and clutch member must be moved to open positions, after the cover is partially in place, a block or gag cannot be placed under the clutch before replacing the cover plate, nor thereafter, as the cover plate sufficiently covers the chamber to prevent such blocking. It will then be seen that the valve cannot be set when the clutch is blocked, consequently the device cannot be improperly set and left so that it will be inoperative.

The operation of the valve and allied parts may be briefly described as follows: It being assumed that the valve and parts are in position, as shown for example in Fig. 1, if the air is placed in the system end of the device, filling the chamber, and the casing above the valve, the pressure forces and maintains the valve 7 down upon its seat 6, as well as forcing the disk or ring 9 upon the seat 10. The device having been primed as previously mentioned, there is some water in the casing above the valve so as to form a water seal before the air pressure is applied in the system. Because of the compensating mechanism between the valve and its arm, the valve may make its final movement in seating without movement of the arm. Any water which seeps or passes past the valve seat itself into the neutral or intermediate chamber 21 is discharged through the drain outlet 22, at which there is a suitable alarm device (not shown) arranged to give an alarm should there be a sudden rush of water for any reason whatever, caused by the opening of the valve or by excessive leakage.

It may be assumed that owing to the opening of a sprinkler head caused by fire that the air pressure in the system is reduced. The air pressure being reduced, valve 7 opens to admit water to the system. If valve 7 is not provided with locking means for locking it open, or preventing its closing, when the column of water above the valve is of sufficient weight to be greater than the water pressure at the inlet 2, the column of water would close and securely maintain the valve in closed position. With my locking device, however, as the valve opens, the clutch member 47, in engagement with the face 53, moves freely to permit the opening of the valve. If there is any tendency of the valve to close, however, the lip 45 co-acting with the clutch or locking member 47, forces the clutch or locking member face 46 into engagement with the wall 53, securely locking the valve against a closing movement. The greater the pressure on the valve, tending to close it, the greater the thrust of the locking or clutch member. Consequently, the greater the pressure the more positive is the lock. However, the valve is always free to open farther or wider, as the locking or clutching member only operates to lock it when the valve moves toward its closed position, but it is at all times in position to operate on any closing movement of the valve and immediately lock it or arrest its movement.

The device is simple in design and easy to care for; the valve is mounted on one pair of trunnions and the valve locking mechanism involves no loose parts which are liable to be lost or misplaced. No delicate parts are employed which are likely to get out of order, or compression screws or levers which may be damaged or bent, are incorporated in the construction. It will be noted that the differential valve plate swings entirely clear of the water channel, and the opening action of the air disk gives simultaneous relief to the water disk. All of the working parts of the device except the differential valve plate can be replaced or renewed, without taking the device out of the system. The water and air disk rings can be re-ground by unbolting and removing the hand hole cover plate alone.

The differential valve is automatically and instantly locked against closure at all points, its arc of travel thus precluding the possibility of closing and water columning the valve at any time after an initial opening movement. The operative principle of the valve is simple. It is positive in action, and the valve and its operating principles are such as to be readily understood by caretakers in the field.

The opening action is always quick, smooth and noiseless, and free from jar and pounding due to back lash. The trip point or operating characteristics of this device is uniform and unalterable. The valve cannot be set up without having all parts in their correct relative position, and both hand hole cover plates must be in place before air pressure can be pumped up and the valve set in operative condition.

It will be noted that the differential valve being made turtle-back, successful gagging or blocking of the valve open is a difficult matter. It will be particularly noted that the locking device cannot be gagged or blocked except when the clutch chamber cover is entirely removed, and the cover cannot be replaced unless the clutch is free to operate. Obviously, since the locking mechanism is contained in a separate chamber, sticks, stones, sand or other refuse entering the valve casing through the water supply cannot interfere with the locking action.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. In a dry pipe valve of the kind described, the combination of a suitable casing provided with an inlet and outlet, valve mechanism for controlling the passage of fluid through the casing, a pivotally supported valve carrying arm, and means for locking said valve open at any intermediate point in its travel, said means including a strut member having a fixed pivotal eccentric connection with said arm; and a stationary part to be engaged by the strut.

2. In a dry pipe valve of the kind described and in combination, a casing, a valve, locking mechanism therefor arranged within the casing, said casing being provided with an opening adjacent the locking mechanism, a cover plate for said opening, and means coöperating with and engaging the valve mechanism for detachably retaining said cover plate in place, said means permitting of swinging movement of the cover plate to only a limited extent sufficient to only partially uncover the opening.

3. In a dry pipe valve of the kind described, the combination of a suitable casing having an inlet and outlet, a valve and clutch locking mechanism therefor arranged within said casing, said casing provided with a hand hole and cover therefor adjacent the locking mechanism, and means coöperating with and engaging the valve mechanism for detachably retaining said cover plate in place, whereby the same may be detached from the casing upon manipulating the valve and cover plate in predetermined manner.

4. In a dry pipe valve of the kind described, the combination of a suitable casing provided with an inlet and outlet, valve mechanism for controlling the passage of fluid through the casing, a pivotally supported valve carrying arm, and means within the casing for locking said valve open at any intermediate point in its travel, including a clutch member pivotally carried by the valve carrying arm, and means for engaging said member.

5. In a dry pipe valve of the kind described, the combination of a suitable casing provided with an inlet and outlet, valve mechanism for controlling the passage of fluid through the casing, a pivotally supported valve carrying arm, and means within the casing for locking said valve open at any intermediate point in its travel, including a pair of toggle members, one carried by the arm, and the other pivotally secured thereto and means for engaging the last mentioned member.

6. In a dry pipe valve of the kind described, the combination of a suitable casing provided with an inlet and outlet, a valve for controlling the passage of fluid through the casing, an arm pivotally supported at one end and connected at its opposite end to said valve, said arm having a radial extension at its pivoted end, a strut member having a fixed pivotal connection at one end with said extension, and a stationary part to be engaged by the strut.

7. In a device of the kind described and in combination, a casing having a valve chamber with an inlet and outlet, and a clutch chamber, valve mechanism in the valve chamber, a clutch mechanism in the clutch chamber, said valve and clutch mechanism operatively connected together, a clutch chamber cover plate, and means coöperating with the valve mechanism for normally securing the cover plate against complete removal.

8. In a device of the kind described and in combination, a casing having a valve chamber with an inlet and outlet, and a clutch chamber, valve mechanism in the valve chamber, a clutch mechanism in the clutch chamber, said valve and clutch mechanism operatively connected together, a clutch chamber cover plate, means coöperating with the valve mechanism for pivotally securing said cover plate in place, and means for normally limiting the pivotal movement of the cover plate.

9. In a dry pipe valve of the kind described and in combination, a casing having suitable valve mechanism, and provided with a hand hole in one of the walls thereof, a cover plate for said hand hole, and means coöperating with a portion of the valve mechanism, for detachably retaining the cover plate on the casing.

10. In a dry pipe valve of the kind described and in combination, a casing having suitable valve mechanism, and provided with a hand hole opening in one of the walls thereof, a cover plate for said opening, and means for normally securing the cover rigidly in place, and independent means coöperating with the valve mechanism for pivotally retaining the cover plate on the casing, whereby the same may be turned to display a portion of the opening covered thereby.

11. In a device of the kind described and in combination, a casing having suitable valve mechanism contained therein, and provided with a hand hole opening in one of the walls thereof, a cover plate for said opening, means for securing said cover plate in place, means independent of said securing means for pivotally retaining the cover plate on the casing, whereby the same may be turned to display a portion of the opening covered thereby, means coöperating with the plate for limiting the movement of the plate, and means coöperating with the valve mechanism for normally preventing movement of the plate to clear said limiting means.

12. In a dry pipe valve of the kind described, the combination of a casing provided with valve and clutch chambers therein, said valve chamber provided with an inlet and outlet, a valve arranged in said valve chamber, an arm yieldingly connected to said valve, said arm provided with a part projecting into the clutch chamber, means for pivotally supporting said arm at each side thereof, a clutch mechanism arranged within the clutch chamber and pivotally carried by the projecting end of said arm for locking the arm against movement in one direction, said casing provided with a hand hole opening having a clutch chamber cover plate adjacent the clutch mechanism, means carried by said cover plate for detachably engaging the projecting part of said arm, and independent means for normally securing the cover plate in place.

13. In a dry pipe valve of the kind described, the combination of a casing provided with valve and clutch chambers therein, said valve chamber provided with an inlet and outlet, a valve arranged in said valve chamber, an arm yieldingly connected to said valve, said valve formed with a convex top with a groove in the top face of a size to receive a portion of said arm, said arm provided with a part projecting into the clutch chamber, means for pivotally supporting said arm at each side thereof, a clutch mechanism arranged within the clutch chamber and pivotally carried by the projecting end of said arm for locking the arm against movement in one direction, said casing provided with a hand hole opening having a clutch chamber cover plate adjacent the clutch mechanism, means carried by said cover plate for detachably engaging the projecting part of said arm, pivotally supporting the plate, and independent means for normally securing the cover plate in place.

14. In a dry pipe valve of the kind described, the combination of a suitable casing provided with suitable chambers, a valve arranged in one chamber and having a part projecting into the other chamber, means in said last mentioned chamber for locking the valve against a closing movement, said casing provided with a hand hole at said last mentioned chamber, and a cover plate for covering said hole, and means for retaining said cover in place, whereby the cover may be turned to uncover a portion of the opening, a stop for limiting the movement of the cover plate, said retaining means arranged to permit the complete removal of the cover plate upon an initial movement of the cover plate to engage said stop, and movement of the valve to open position, thence a movement of the cover plate away from the casing, and movement of the cover plate to engage the stop at the other side, and movement of the valve to its closed position, thence a drawing of the cover plate from the casing.

15. In a dry pipe valve of the kind described, the combination of a casing provided with chambers therein, one chamber provided with an inlet and outlet, the other chamber provided with an opening in the wall thereof, and with a cover plate for the opening, a valve arranged in the first mentioned chamber between the inlet and outlet, an arm operatively connected with said valve, and trunnions for pivotally carrying said arm, one of said trunnions secured to said cover plate, said arm arranged to detachably engage said last mentioned trunnion and normally prevent the removal of the trunnion and cover plate, means within the chamber between the cover plate and end of the arm for supporting said trunnion, means arranged between said trunnions for supporting said arm, and means carried by said arm in the clutch chamber for normally preventing a closing movement of the valve.

16. In a dry pipe valve of the kind described, the combination of a suitable casing provided with a valve chamber and a clutch chamber, said valve chamber having an inlet and outlet, a casing provided with a hand hole opening into said clutch chamber with a cover plate for normally covering said hand hole, a partition having an opening therethrough arranged between said chambers, a valve arranged in the valve chamber, a valve carrying arm operatively connected with the valve at one end and formed with a transverse extending part at the other end, said transverse part extending through and closely fitting said partition, and means arranged within each chamber at the sides of said valve-carrying arm for pivotally supporting the same, the supporting means in the clutch chamber consisting of a trunnion carried by said cover plate, and extending into the recess at the end of the projecting part of said arm, said trunnion and arm arranged to normally interengage and prevent the separation of the trunnion and arm, means between the arm and cover plate for pivotally supporting the trunnion and cover plate, means for limiting the movement of the cover plate and trunnion, and means coöperating with the projecting end of said arm within the clutch chamber for normally preventing a closing movement of the valve mechanism.

17. In a dry pipe valve of the kind described and in combination, the combination of a suitable casing provided with chambers therein, with an inlet and outlet for one of said chambers, a valve arranged in said last mentioned chamber, an arm connected to said valve, said arm having a part at one end projecting into the other chamber, means for pivotally supporting the said end of said arm, comprising a trunnion at each end, said casing provided with a hand hole opening and a cover plate, for the second mentioned chamber, the part of said arm end in said chamber formed with a recess therein, the trunnion at said end projecting through the cover plate and into said recess, said trunnion formed with flanges thereabout with one flange cut away on one side and the other on another side, and means carried by said part arranged within said recess for engaging either of said flanges.

18. In a valve of the kind described and in combination, a casing, a valve mechanism arranged therein for controlling the passage of fluid through the casing, movable locking means arranged within the casing for positively opposing the closing movement of the valve, said casing provided with an opening in the wall thereof adjacent said means, a cover plate for said opening, detachable means for normally securing said plate rigidly in place, and independent means coöperating with the valve mechanism for retaining the plate in place, said independent means permitting movement of the plate to only a limited extent sufficient to display a portion of said locking means and cover the remaining portion of the locking means.

In testimony whereof I have hereunto signed my name in the presence of two subscribing witnesses.

ALLAN J. GROSS.

Witnesses:
ROY W. HILL,
CHARLES I. COBB.

Copies of this patent may be obtained for five cents each, by addressing the "Commissioner of Patents, Washington, D. C."